Figure 1:
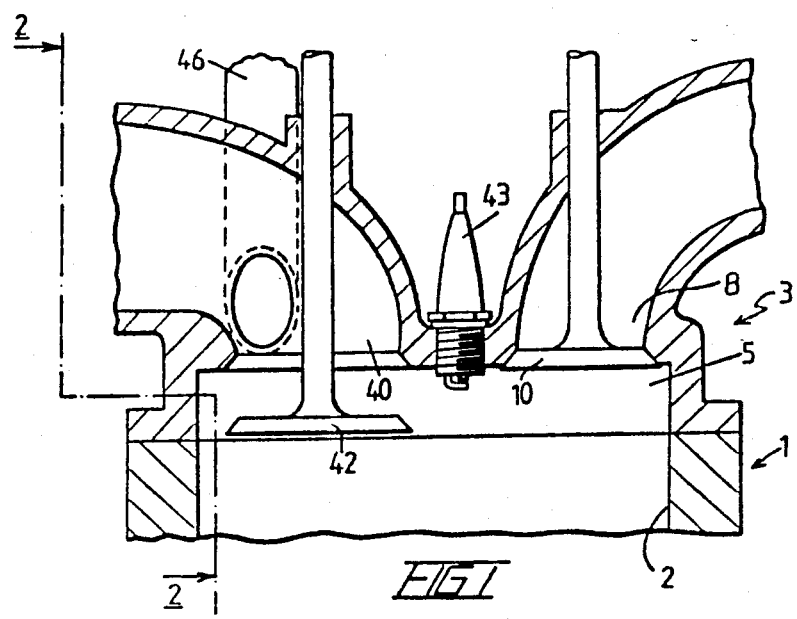

United States Patent [19]

Trihey

[11] Patent Number: 4,625,693

[45] Date of Patent: * Dec. 2, 1986

[54] INTERNAL COMBUSTION ENGINE

[76] Inventor: John M. Trihey, 89 Kalinda Road, Ringwood, Victoria, Australia

[*] Notice: The portion of the term of this patent subsequent to Dec. 17, 2002 has been disclaimed.

[21] Appl. No.: 759,530

[22] Filed: Jul. 26, 1985

Related U.S. Application Data

[60] Continuation of Ser. No. 463,452, Jan. 21, 1983, Pat. No. 4,558,670, which is a continuation-in-part of Ser. No. 202,030, Oct. 29, 1980, abandoned, which is a division of Ser. No. 861,929, Dec. 19, 1977, Pat. No. 4,249,495.

[30] Foreign Application Priority Data

May 29, 1981 [AU] Australia ............................. 9111/81

[51] Int. Cl.⁴ ............................................ F02B 17/00
[52] U.S. Cl. ..................................... 123/432; 123/308
[58] Field of Search ............... 123/308, 432, 430, 433, 123/76, 65 VB, 65 VC, 73 C

[56] References Cited

U.S. PATENT DOCUMENTS 4,558,670 12/1985 Trihey .................................. 123/308

FOREIGN PATENT DOCUMENTS 1254315 11/1971 United Kingdom ................ 123/308

Primary Examiner—Ronald H. Lazarus
Attorney, Agent, or Firm—Flynn, Thiel, Boutell & Tanis

[57] ABSTRACT

An internal combustion engine in which a stream of air from a duct (46) to a cylinder (2) so as to flow adjacent to the cylinder walls. The duct (46) is arranged to admit the air only while the exhaust valve (42) is open. The air will circulate against the cylinder walls during the exhaust stroke but at least a portion thereof will remain adjacent the cylinder walls during the subsequent compression stroke. The combustible charge is admitted generally centrally of cylinder and remains stratified with respect to the circulating air. The circulating air maintains the combustible mixture relatively concentrated for good ignition, cushions the igniting gases, assists in maintaining the cylinder walls clean and cools the exhaust valve.

8 Claims, 6 Drawing Figures

INTERNAL COMBUSTION ENGINE

This application is a continuation of U.S. application Ser. No. 463,452 filed Jan. 21, 1983 now U.S. Pat. No. 4,558,670, corresponding to a nationalization of PCT application Ser. No. PCT/AU82/00086 filed May 28, 1982, in turn a continuation-in-part of U.S. application Ser. No. 202,030 filed Oct. 29, 1980, in turn a divisional of U.S. application Ser. No. 861,929 filed Dec. 19, 1977, now U.S. Pat. No. 4,249,495.

This invention relates to internal combustion engines, especially, but not exclusively, to four stroke spark ignition engines.

The U.S. Pat. No. 4,249,495 discloses an internal combustion engine in which there are stratified charges of fuel-rich mixture and fuel-lean mixture (or air). The fuel-lean or air mixture is admitted to the cylinder so as to circulate about the cylinder walls and so concentrate the fuel rich mixture in a central core in the combustion chamber. The air-rich mixture is arranged to remain unmixed with the air so that concentrated fuel-rich mixture is located adjacent to the spark plug whereby reliable ignition takes place.

It has now been found that substantial advantages can be obtained if the air is admitted to the cylinder during the exhaust stroke rather than during the induction stroke.

The main advantage to be obtained is that the engine can maintain the charges stratified even at relatively low throttle settings which is a substantial advantage since reliable ignition at low throttle settings has always been a problem with internal combustion engines. Secondly, the circulating air can be used to cool the exhaust valve and this reduces wear and further reduces the production of oxides of nitrogen.

In this specification, reference is made to the introduction of air to circulate about the cylinder walls but it is to be understood that any inert gas could be used. It would be possible to use a lean air-fuel mixture, but air is preferred.

According to the present invention there is provided an internal combustion engine comprising at least one cylinder, a piston reciprocally mounted in the cylinder, a cylinder head having a combustion chamber formed therein, an inlet port for admission of air-fuel mixture, an exhaust port for egression of combustion products, inlet valve means for opening and closing said inlet port, an exhaust valve means for opening and closing said exhaust port, timing means for controlling said inlet and exhaust valve means, characterized by the provision of air inlet means for admitting a tangential stream of air adjacent to the cylinder when said exhaust valve means is open.

The invention also provides a cylinder head for an internal combustion engine, said engine having at least one cylinder and a piston reciprocally mounted in the cylinder, said head having a combustion chamber formed therein, an inlet port for admission of air-fuel mixture, an exhaust port for egression of combustion products, an inlet valve for opening and closing said inlet port, an exhaust valve for opening and closing said exhaust port, timing means for controlling said inlet and exhaust ports, characterized by the provision of air inlet means for admitting a tangential stream of air adjacent to the side walls of the combustion chamber when said exhaust valve is open.

Figure 3:
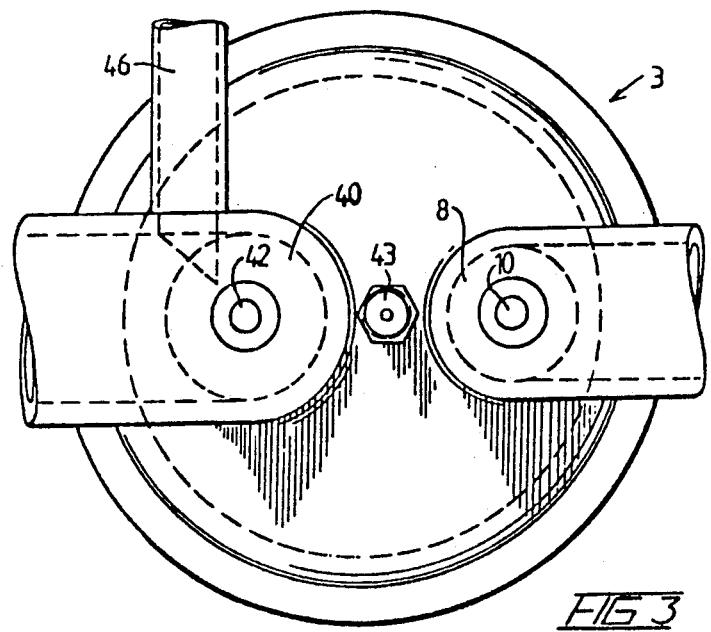
Figure 2:
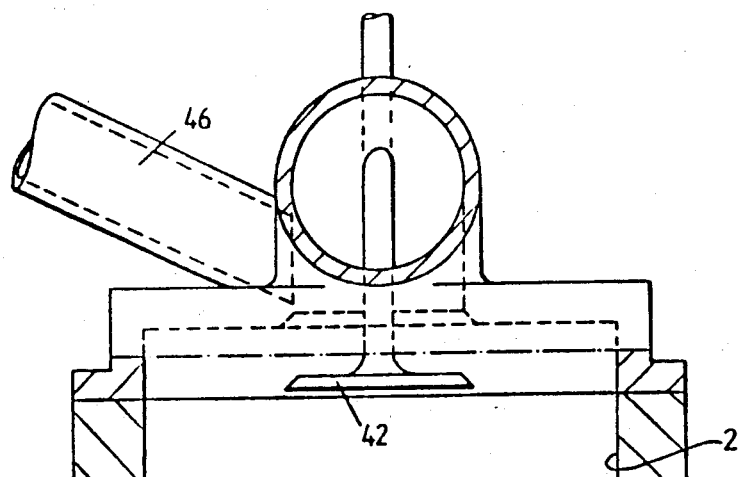
Figure 4:
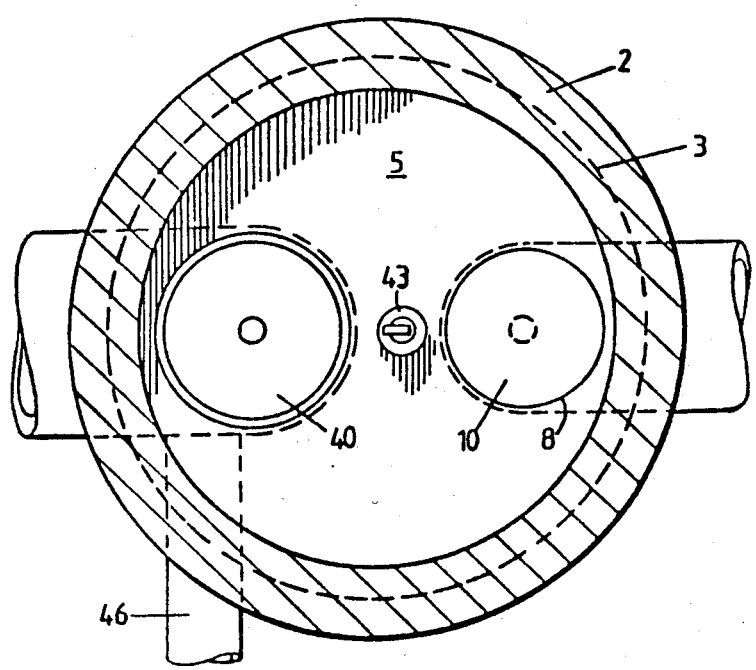
Figure 5:
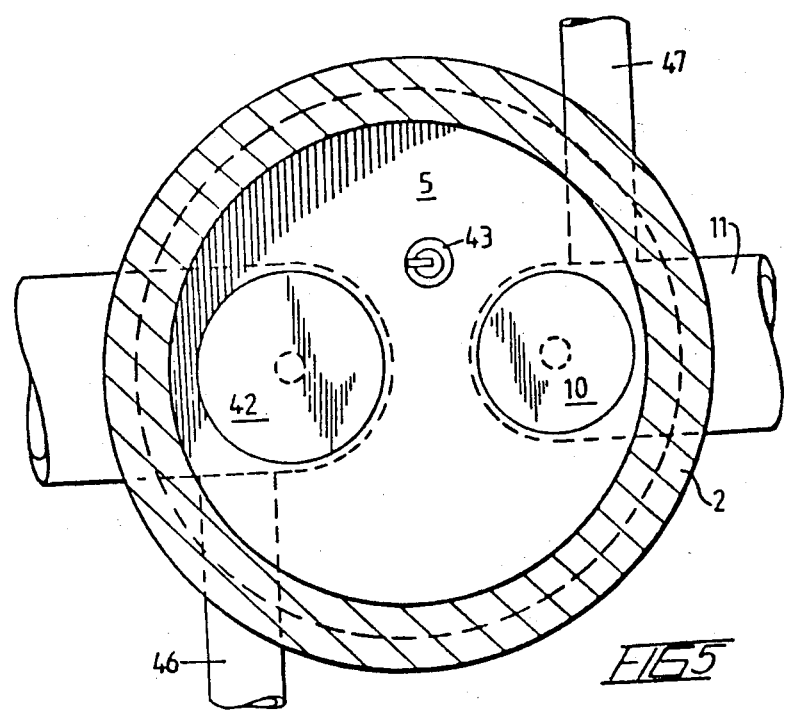
Figure 6:
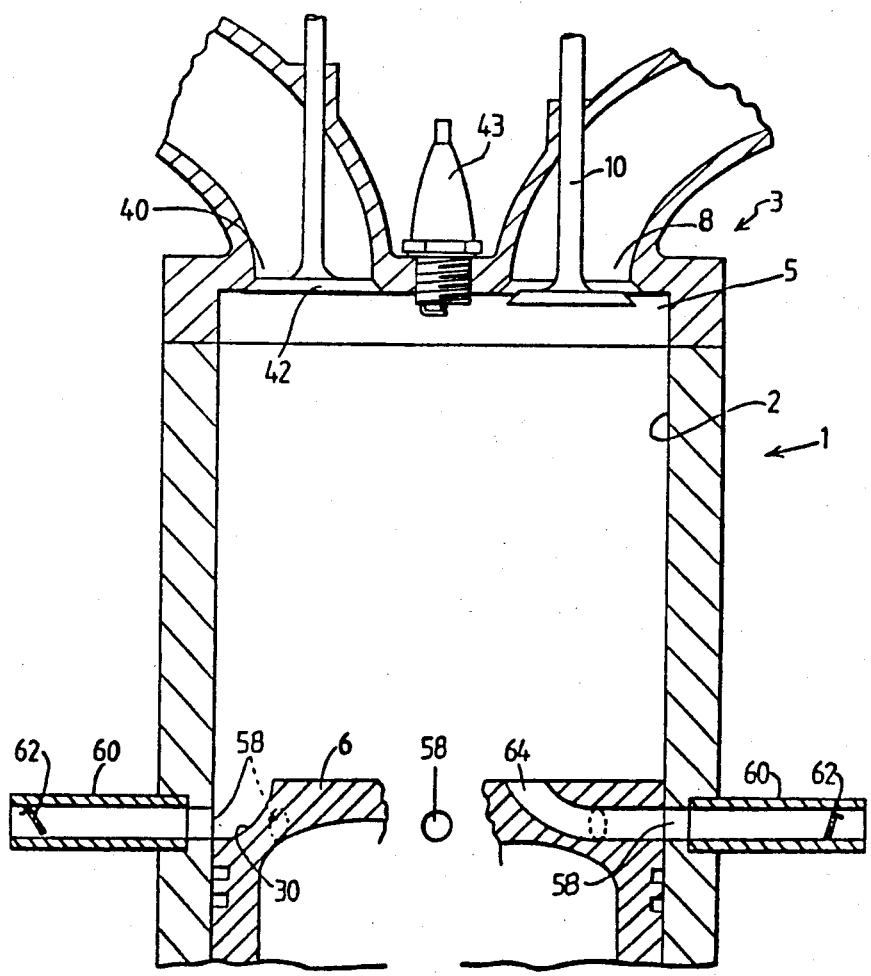

The invention will now be further described with reference to the accompanying drawings, in which:

FIG. 1 is an axial cross section through a four stroke engine embodying the invention, FIG. 2 is a cross sectional view taken along the line 2—2, FIG. 3 is a top plan view of the arrangement shown in FIG. 1, FIG. 4 is a view into the combustion chamber of the arrangement shown in FIG. 1, FIG. 5 is a view looking into the head from beneath a modified arrangement of the invention, and FIG. 6 is a schematic axial cross-section through a two valve four stroke engine having air inlet ducts formed in the cylinder wall.

FIGS. 1 to 4 illustrate one cylinder of a four stroke engine which may have in practice included any number of identical cylinders. The engine includes a cylinder block 1 formed with a cylinder 2 within which a piston (not shown) is reciprocally mounted. A cylinder head 3 is mounted on top of the cylinder block and includes inlet and exhaust ports 8 and 40 for each cylinder. Inlet and exhaust valves 10 and 42 are provided for opening and closing the ports 8 and 40 and timing means (not shown) of conventional construction can be provided for opening the valves in the correct sequence.

The inlet port 8 is connected to a carburettor (not shown) in the usual manner and is directed so as to introduce air-fuel mixture into the cylinder 2 generally centrally thereof and without any substantial tangential component. A spark plug 43 is located generally centrally of a combustion chamber 5 formed in the head.

The head includes an inlet pipe 46 for admission of a non combustible gas such as air so as to swirl adjacent to the cylinder wall. The end of the pipe 46 is located near the cylinder wall so that air is discharged therefrom with a substantial downward and tangential component so that the air will swirl about the inner walls of the cylinder. The pipe 46 is preferably connected to a blower (now shown) which supplies air thereto at about 10 p.s.i. The blower can remain in continuous operation so that it will circulate cool air over the back of the exhaust valve 42 when the latter is closed. This is particularly useful since it cools the exhaust valve and this has the effect of reducing the production of pollutants, notably oxides of nitrogen. Further, it also reduces wear on the exhaust valve.

In a normal four stroke engine, the timing is arranged so as to operate the exhaust valve 42 and open the port 40 when the piston is near bottom dead centre. At this point the exhaust gases within the piston are at a relatively high pressure and are rapidly expelled from the port 40. At this stage, the flow of air from the pipe 46 may cease because of the relatively high pressure but this is only a temporary condition since the pressure will soon fall to atmospheric or even below atmospheric because of the kinetic effect of the discharging exhaust gases. Once the pressure has dropped to about the same level as that applied to the pipe 46 by the blower, cold air will be admitted into the cylinder so as to swirl about the cylinder wall. The swirling mass of relatively cold air has a number of beneficial effects. Firstly, the air will tend to cool the cylinder walls and so reduce heat losses through the cylinder walls and reduce wear on the cylinder walls. Second, as the piston proceeds through the exhaust stroke, the circulating air will tend to force the residual exhaust in the head space out the exhaust port 40 and so have an important scavenging effect.

Third, and most importantly, when the exhaust valve closes there will be remaining in the head space a circulating stream of relatively cool air which will tend to remain circulating within the combustion chamber even when the new charge of air-fuel is admitted after opening the inlet valve 10. The air-fuel thus resides in a central core in the cylinder with the relatively cool air circulating about the cylinder walls and this situation tends to remain unchanged during the induction stroke and the subsequent compression stroke. Therefore, at the time of firing of the spark plug 43, the air-fuel mixture is located in a central core immediately adjacent to the spark plug 43, with the cool air still circulating about the combustion chamber 5.

In order to enhance the effect of stratification of charges as noted above, it is desirable that the combustion chamber 5 be formed as a surface of revolution with a minimum of projections therein. Further, the bottom of the valves 42 and 10 lie flush with the upper part of the combustion chamber when closed. The stratification effect just described would be further enhanced by locating the inlet port 8 more centrally of the head and by heating the air-fuel mixture prior to admission so as to reduce its effective density.

It will be appreciated that the air-fuel mixture will tend to be concentrated in a core near the spark plug 43 so that reliable ignition occurs. This will be the case even though there is an overall air-fuel ratio which is much less than stoichiometric because of the air admitted through the pipe 46. A further advantage is that once ignition does occur, the circulating air located near the cylinder wall has a cushioning effect and so reduces the tendency for peaks of pressure to occur in the cylinder. In view of the latter effect, it is envisaged that non-leaded fuels could be utilised in engines of the invention.

The arrangement of FIG. 5 is essentially the same as that shown in FIGS. 1 to 4 except that in this case the cylinder head 3 is provided with a second air inlet tube 47 which opens to the inlet port 8 instead of the exhaust port. The pipe 47 is directed tangentially and downwardly as is the pipe 46 and the air admitted there through tends to assist in maintaining the centrificial stratification of charges during the induction stroke of the engine since the pipe 47 will admit air to the cylinder when the inlet valve 10 is open.

FIG. 6 illustrates an alternative arrangement in which air is admitted to the cylinder at or near the bottom of the exhaust stroke of the piston 6. Air is admitted through ports 58 in the cylinder which register with ducts 60 which are provided with valves 62 synchronised with the timing of the exhaust and inlet valves 42 and 10. The air admitted at the bottom of the stroke could be an alternative to the arrangement shown in FIG. 1 or additional thereto.

It is preferred of course that the tubes 62 be disposed so as to impart a tangential component to the incoming air so that it will circulate against the cylinder wall. Further, the air should have an upward component of velocity and this can be effected by means of a deflecting rebate 30 provided near the crown on the piston, as seen on the left-hand side of FIG. 6. On the right-hand side, there is shown a variation where the ports 58 register with ducts 64 formed into the piston crown, the orientation of the ducts 64 being chosen to impart a tangential and upward component of velocity to the incoming air.

The invention is also applicable to two stroke engines. In particular, it would be applicable to two stroke engines which include an inlet valve in the head for admission of combustible mixture to the cylinder and arrange to have exhaust ports in the bottom of the cylinder wall, these ports being opened when the piston is near bottom dead centre of its stroke. The tangential air would be admitted through the exhaust ports or adjacent thereto and operate to introduce circulating air around the cylinder walls and such circulating air would tend to assist in scavenging the exhaust from the cylinder.

The invention is also applicable to diesel engines. For instance, a suitable arrangement would be similar to FIG. 1 except that the spark plug 43 would be replaced by a fuel injector arranged to direct fuel centrally of the cylinder and air (or other working fluid) would be admitted through the inlet port 8 under control of the inlet valve 10.

The air or relatively inert gas admitted through the pipe 46 also serves to keep the fuel rich mixture away from the cylinder walls. This would be especially important where solid hydrocarbons, such as coal dust, were mixed with the liquid fuel charge, the latter technique being presently investigated with injected diesel engines.

In the arrangement illustrated in FIG. 1, it may in some circumstances be desirable to include a flap valve (not shown) in the pipe 46 so as to stop the high pressure exhaust gases entering the blower. Alternatively, the end of the pipe 46 in the exhaust duct may be so shaped so as to avoid admission of exhaust gases in the pipe 46. One such shape is illustrated in FIG. 3 where the end of the pipe 46 is shown as having an angular end 80 (shown in chain line in FIG. 3), the angular end having its longer face upstream of the exhaust flow.

A further advantage of the invention is that the introduction of air into the exhaust tends to dilute the exhaust gases.

In the arrangement illustrated in FIG. 5, it would be possible to arrange for the pipe 47 to receive its air from the atmosphere or alternatively to be connected to the same blower which supplies air under pressure to the pipe 46. The pipe 47 may include its own valve which is synchronised with the inlet valve 10 or alternatively may utilise the valve 10 itself to control admission of air into the piston. Similarly, the pipe 46 may include a separate valve for controlling admission of air to the cylinder. If separate valves are provided for the pipes 46 and 47, these can be timed from the cam shaft which would normally be provided for operating the valves 10 and 42.

Many modifications will be apparent to those skilled in the art without departing from the spirit and scope of the invention.

I claim:

1. A method of operating an internal combustion engine having a cylinder and piston reciprocally mounted therein, said method including egressing combustion products from the cylinder during an exhaust stroke, admitting to the cylinder a tangential stream of air only during said exhaust stroke at a pressure and direction relative to the cylinder such that said stream of air circulates against the cylinder wall, introducing a combustible mixture of a working fluid and fuel into said cylinder during an induction stroke, maintaining said stream of air and said combustible mixture substantially stratified during a compression stroke, in which the engine includes an exhaust duct and an exhaust valve for opening and closing same to said cylinder and in which the step of admitting to the cylinder a tangential stream of air includes routing the air stream through an opening, as seen in plan, transversely into said exhaust duct adjacent to and generally tangentially of said cylinder wall, and avoiding exhaust flow into said opening when said exhaust valve is open by providing the opening with a shielding means upstream in the exhaust flow from said opening.

2. A method of operating an internal combustion engine having a cylinder and piston reciprocally mounted therein, said method including egressing combustion products from the cylinder during an exhaust stroke, admitting to the cylinder a tangential stream of air only during said exhaust stroke at a pressure and direction relative to the cylinder such that the stream of air circulates against the cylinder wall, introducing a working fluid into said cylinder, maintaining said stream of air circulating about the cylinder wall during a compression stroke of the engine and injecting fuel centrally of the cylinder into said working fluid, whilst maintaining stream of air stratified with respect to said working fluid, in which the engine includes an exhaust duct and an exhaust valve for opening and closing same to said cylinder and in which the step of admitting to the cylinder a tangential stream of air includes routing the air stream through an opening, as seen in plan, transversely into said exhaust duct adjacent to and generally tangentially of said cylinder wall, and avoiding exhaust flow into said opening when said exhaust valve is open by providing the opening with a shielding means upstream in the exhaust flow from said opening.

3. A method as claimed in claim 1, wherein said engine includes an exhaust port and wherein said stream of air is admitted to the cylinder through the exhaust port such that it cools said exhaust valve.

4. A method as claimed in claim 1, wherein two of said tangential streams of air are admitted at opposite sides of the cylinder to circulate against the cylinder wall in the same direction.

5. A method as claimed in claim 1, wherein the combustible mixture is heated prior to admission to the cylinder so as to enhance stratification relative to said stream of air.

6. A method as claimed in claim 1, wherein a further stream of air is admitted through an opening in the cylinder wall at or near the bottom of the stroke of the piston.

7. A method as claimed in claim 6, including the step of imparting an upward component of velocity to said further stream of air by means of at least one formation on the piston.

8. A method as claimed in claim 3, wherein two of said tangential streams of air are admitted at opposite sides of the cylinder to circulate against the cylinder wall in the same direction.

* * * * *